United States Patent
Urata et al.

(10) Patent No.: US 7,042,665 B2
(45) Date of Patent: May 9, 2006

(54) APPARATUS AND METHOD FOR REPRODUCING RECORDED SIGNAL

(75) Inventors: Kaoru Urata, Kanagawa (JP); Mikio Kita, Kanagawa (JP); Mamoru Mizukami, Tokyo (JP)

(73) Assignee: Sony Corporation, (JP)

( * ) Notice: Subject to any disclaimer, the term of this patent is extended or adjusted under 35 U.S.C. 154(b) by 31 days.

(21) Appl. No.: 10/810,717

(22) Filed: Mar. 29, 2004

(65) Prior Publication Data
US 2004/0233562 A1 Nov. 25, 2004

(30) Foreign Application Priority Data
Apr. 4, 2003 (JP) ............................ P2003-101386
Apr. 4, 2003 (JP) ............................ P2003-101387

(51) Int. Cl.
*G11B 20/10* (2006.01)

(52) U.S. Cl. ............................. 360/39; 360/60; 360/64; 360/78.02; 360/77.12; 386/116; 386/124

(58) Field of Classification Search ................ 360/18, 360/21, 31, 53, 62, 39, 64, 77.12, 77.13, 360/78.02; 386/124, 1, 23, 40, 74, 116

See application file for complete search history.

(56) References Cited

U.S. PATENT DOCUMENTS

| | | | | |
|---|---|---|---|---|
| 5,321,557 | A * | 6/1994 | Shimotashiro et al. | 360/77.14 |
| 5,751,890 | A * | 5/1998 | Yamasaki et al. | 386/79 |
| 5,790,746 | A * | 8/1998 | Kashida et al. | 386/116 |
| 6,134,061 | A * | 10/2000 | Inoue et al. | 360/48 |
| 6,639,747 | B1 * | 10/2003 | Asakura et al. | 360/62 |
| 2001/0049804 | A1 * | 12/2001 | Arai | 714/712 |

* cited by examiner

*Primary Examiner*—David Hudspeth
*Assistant Examiner*—Dismery Mercedes
(74) *Attorney, Agent, or Firm*—Rader, Fishman & Grauer PLLC; Ronald P. Kananen

(57) ABSTRACT

In an apparatus for reproducing a recorded signal and the like of this invention, two reproducing heads are provided for a single track with their set positions being deviated in the track width direction. A signal selecting unit discriminates a reproducing head whose tracing condition of a target track is appropriate based on an error correction result of a C1 correcting unit and output levels of reproducing heads. A signal obtained by the discriminated reproducing head is supplied to a C2 correcting unit to generate an output signal. Consequently, an off track allowance is increased as compared with a case where the target track is traced with a single reproducing head. At the time of a special reproducing operation or even if a narrow track pitch system is adopted, a recorded signal is reproducible properly.

22 Claims, 10 Drawing Sheets

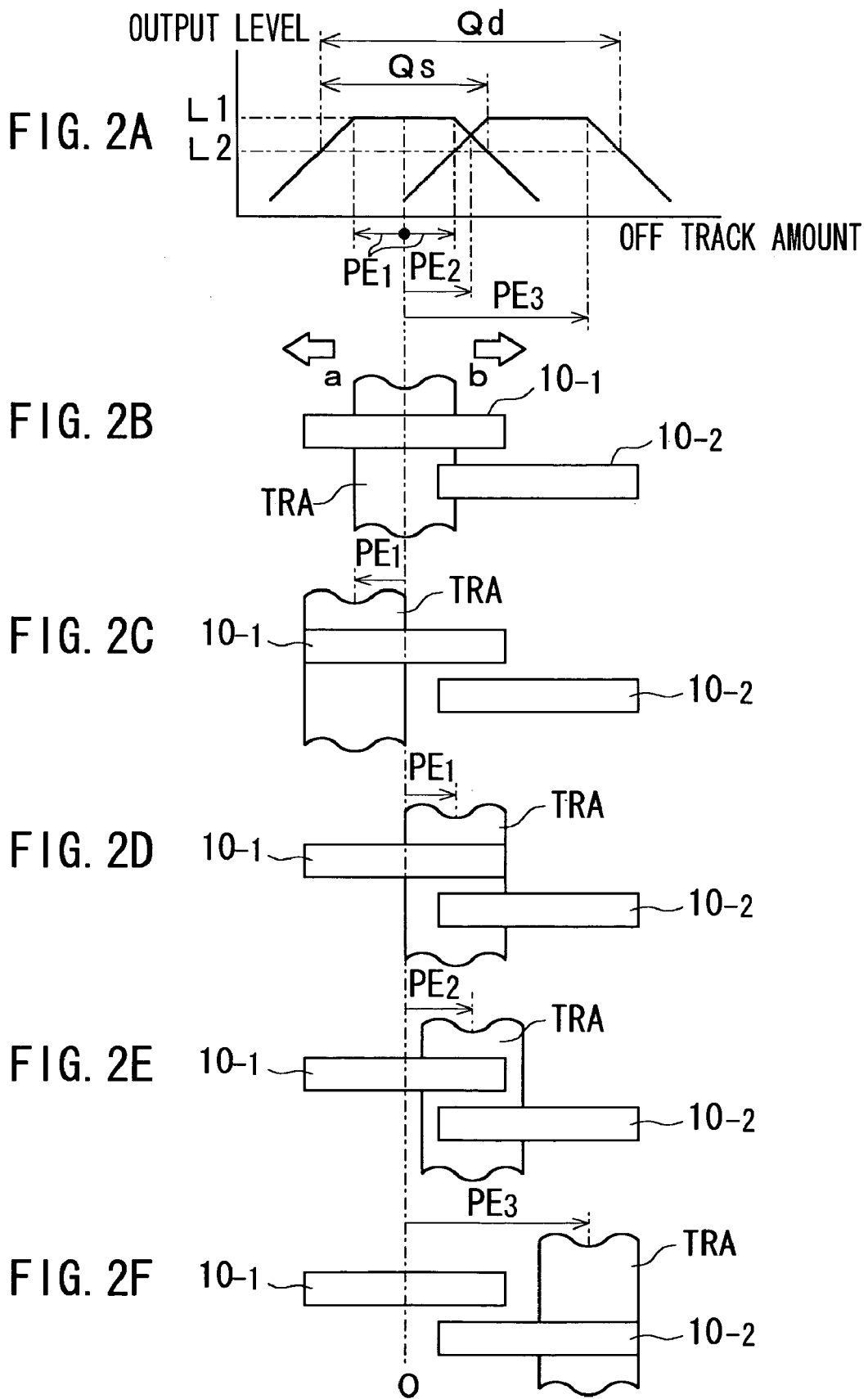

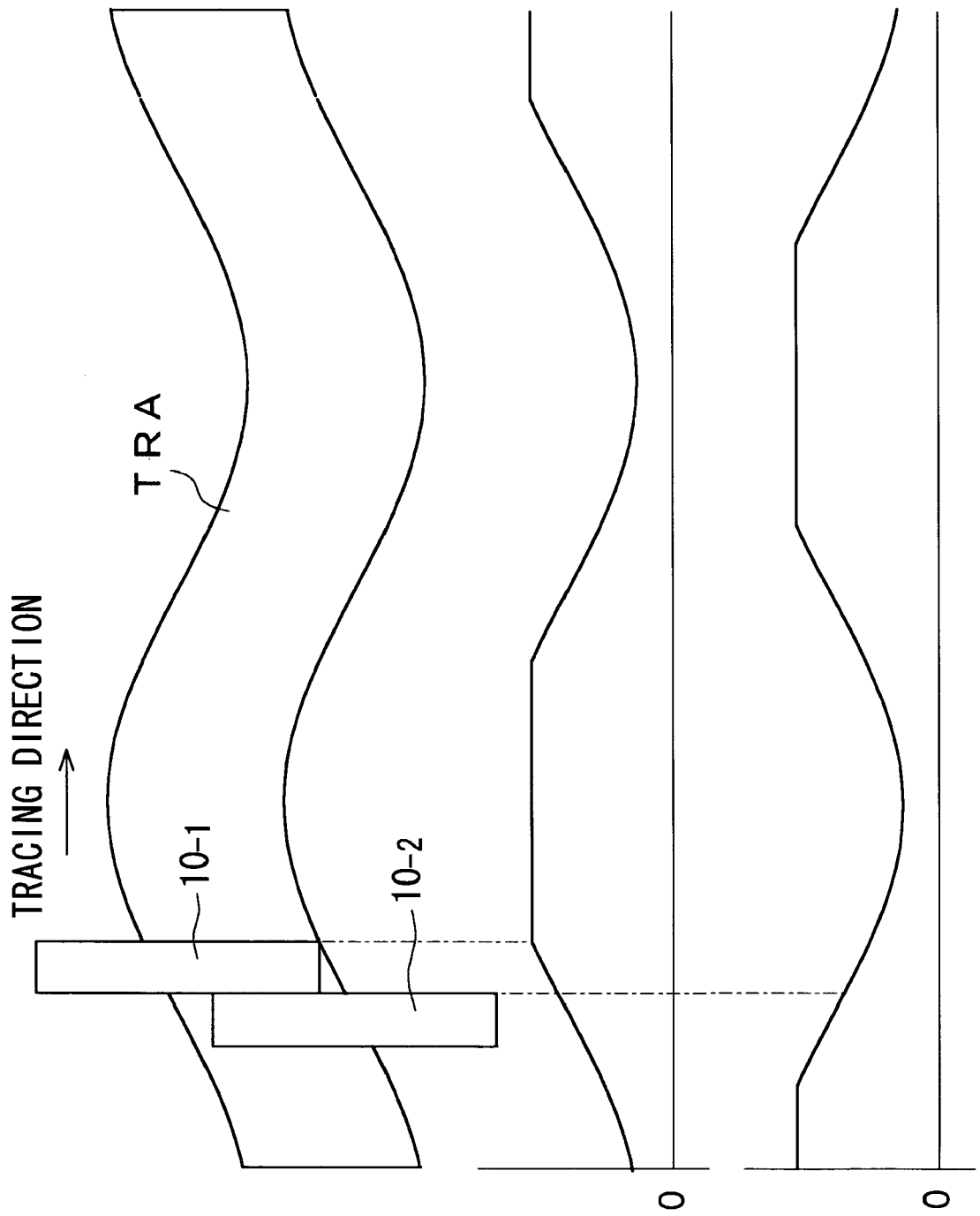

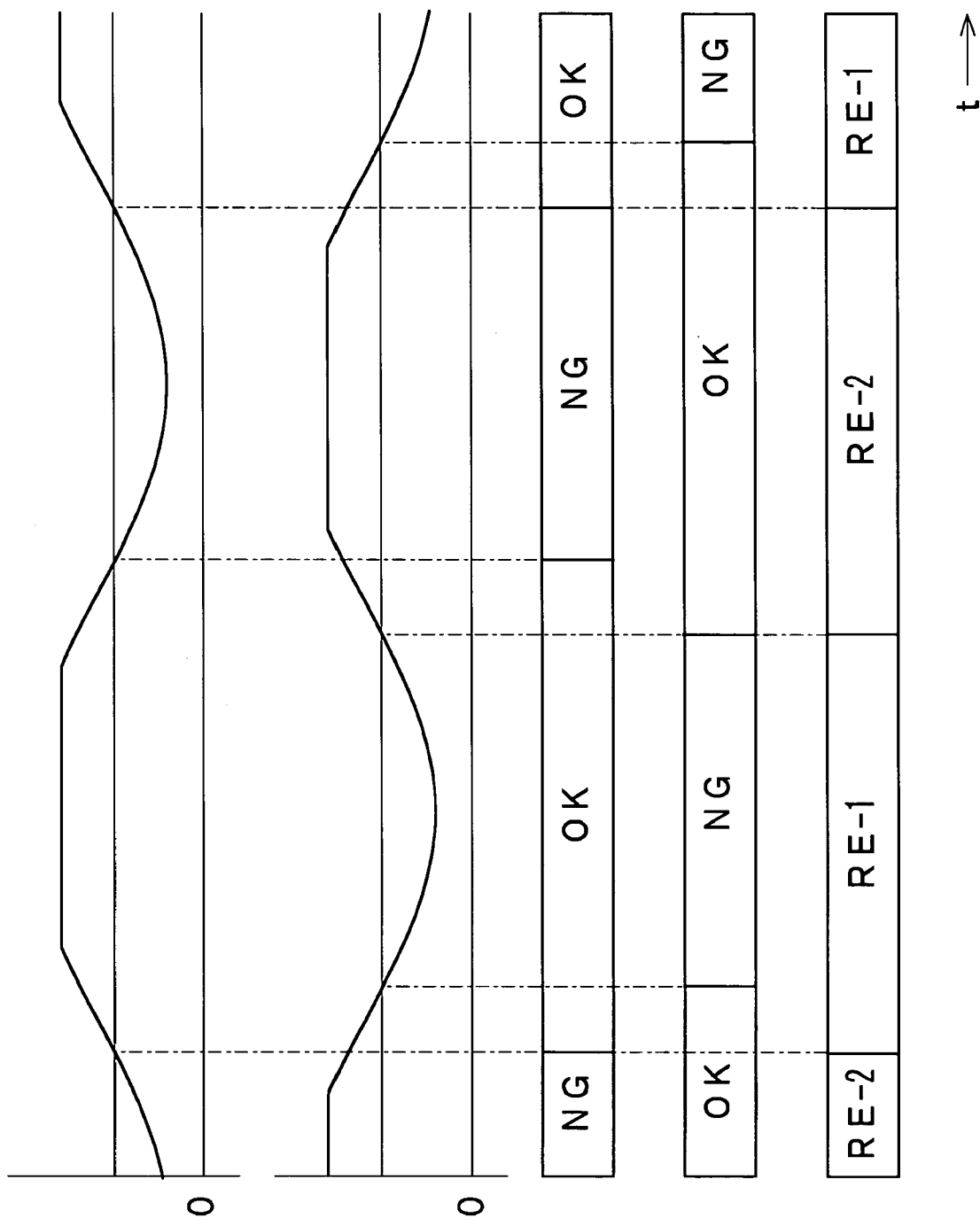

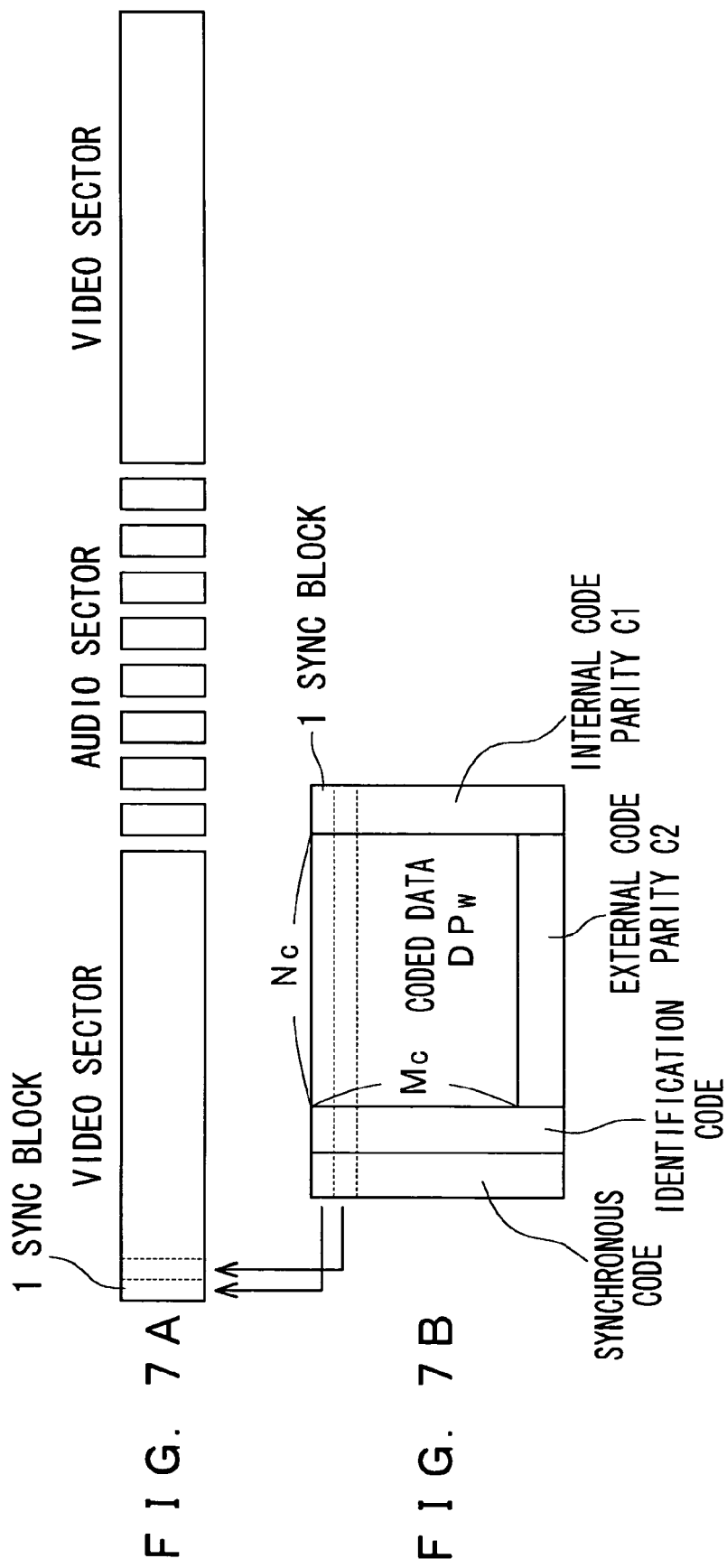

FIG. 10A (RE-1)
FIG. 10B (RE-1d)
FIG. 10C (ARw-1)
FIG. 10D (FS-1)
FIG. 10E (FF-1)
FIG. 10F (FR-1)
FIG. 10G (FV-1)
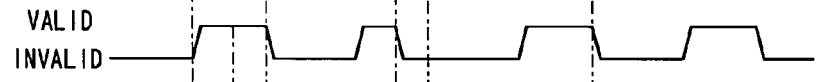
FIG. 10H (CK-1/TID-1)
FIG. 10I (RE-2)
FIG. 10J (ARw-2)
FIG. 10K (FS-2)
FIG. 10L (FF-2)
FIG. 10M (FR-2)
FIG. 10N (FV-2)
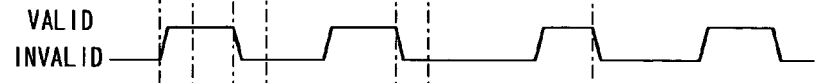
FIG. 10O (CK-2/TID-2)
FIG. 10P (SE)
FIG. 10Q (ARr)
t1 t2 t3 t4   t5 t6   t7

FIG. 11

CONDITION NO.

| | INPUT | | | | | | | | OUTPUT | | |
|---|---|---|---|---|---|---|---|---|---|---|---|
| | FF-1 | FF-2 | FV-1 | FV-2 | CK-1 | CK-2 | TID-1 | TID-2 | SE | FR-1 | FR-2 |
| 1 | 0 | 0 | * | * | * | * | * | * | NOP | 0 | 0 |
| 2 | 1 | 0 | 0 | * | * | * | * | * | NOP | 0 | 0 |
| 3 | 0 | 1 | * | 0 | * | * | * | * | NOP | 0 | 0 |
| 4 | 1 | 1 | 0 | 0 | * | * | * | * | NOP | 0 | 0 |
| 5 | 1 | * | 1 | 0 | * | * | * | * | PRECEDE | 1 | 0 |
| 6 | 1 | * | 1 | 1 | OK | NG | * | * | PRECEDE | 1 | 1 |
| 7 | 1 | * | 1 | 1 | OK | OK | OK | * | PRECEDE | 1 | 1 |
| 8 | 1 | * | 1 | 1 | OK | OK | NG | NG | PRECEDE | 1 | 1 |
| 9 | 1 | 0 | 1 | 1 | OK | OK | NG | OK | NOP | 1 | 0 |
| 10 | 1 | 1 | 1 | 1 | OK | OK | NG | OK | FOLLOW | 1 | 1 |
| 11 | 1 | * | 1 | 1 | NG | NG | OK | * | PRECEDE | 1 | 1 |
| 12 | 1 | * | 1 | 1 | NG | NG | NG | NG | PRECEDE | 1 | 1 |
| 13 | 1 | 0 | 1 | 1 | NG | NG | NG | OK | NOP | 1 | 1 |
| 14 | 1 | 1 | 1 | 1 | NG | NG | NG | OK | FOLLOW | 1 | 1 |
| 15 | 1 | 0 | 1 | 1 | NG | OK | * | * | NOP | 1 | 0 |
| 16 | 1 | 1 | 1 | 1 | NG | OK | * | * | FOLLOW | 1 | 1 |
| 17 | 0 | 1 | 0 | 1 | * | * | * | * | FOLLOW | 0 | 1 |
| 18 | 0 | 1 | 1 | 1 | NG | OK | * | * | FOLLOW | 1 | 1 |
| 19 | 0 | 1 | 1 | 1 | OK | OK | NG | OK | FOLLOW | 1 | 1 |
| 20 | 0 | 1 | 1 | 1 | OK | OK | OK | * | NOP | 0 | 1 |
| 21 | 0 | 1 | 1 | 1 | OK | OK | NG | NG | NOP | 0 | 1 |
| 22 | 0 | 1 | 1 | 1 | NG | NG | NG | OK | FOLLOW | 1 | 1 |
| 23 | 0 | 1 | 1 | 1 | NG | NG | OK | * | NOP | 0 | 1 |
| 24 | 0 | 1 | 1 | 1 | NG | NG | NG | NG | NOP | 0 | 1 |
| 25 | 0 | 1 | 1 | 1 | OK | NG | * | * | NOP | 0 | 1 |

APPARATUS AND METHOD FOR REPRODUCING RECORDED SIGNAL

BACKGROUND OF THE INVENTION

1. Field of the Invention

The present invention relates to an apparatus and a method for reproducing a recorded signal that are applicable to a video tape recorder or the like.

2. Description of Related Art

A narrow track pitch system has been developed as a means for improving the recording density in an apparatus for reproducing a recorded signal, for example, a video tape recorder capable of reproducing a signal recorded in a magnetic tape. With this narrow track pitch system in progress, a recorded track needs to be traced by a reproducing head at a high precision. A small allowance to a track deviation disables a recorded signal from being read out accurately when tracing a track by a reproducing head to read out the recorded signal. Thus, a pair of reproducing heads having a larger track width than that of a recording head, both reproducing heads constituting paired heads with the same azimuth, are provided, and a single track is read out by each of the pair of the reproducing heads at the same time with them overlapping partially with a difference in step in the track width direction, thereby improving the allowance to off-track (deviation of a tracing position to a target track).

At the time of a special reproducing operation, that is, when reproducing at a speed higher or lower than reproduction at single-fold speed, even when the reproducing head is comprised of two heads as a pair, it does not have sufficient allowance to the off track because the track angle and trace angle to a tape traveling direction are different between the reproducing heads. Further, with the narrow track pitch system in progress, the allowance to the off track is decreased.

If the difference in step is increased to improve the allowance to the track deviation, there is a fear that if the amount of the track deviation increases, one reproducing head may reproduce a target track while the other reproducing head may reproduce a different track having the same azimuth. In such a case, if a signal originating from the other reproducing head is used as a signal read out from a magnetic recording medium, a proper reproduced signal cannot be obtained.

SUMMARY OF THE INVENTION

Accordingly, it is an object of the present invention to provide an apparatus and a method for reproducing a recorded signal that are capable of reproducing a target track properly.

To achieve the above object, according to an aspect of the present invention, there is provided an apparatus for reproducing a recorded signal. The apparatus comprises a head assembly including multiple reproducing heads provided for a single track with the heads being deviated from each other in their positions in the track width direction. The apparatus also comprises a reproduced signal processor for performing error correction processing on data generated from a signal obtained by the multiple reproducing heads, discriminating a reproducing head whose tracing condition of a target track is appropriate from the multiple reproducing heads based on a result of the error correction, and generating an output signal using a signal obtained by the discriminated reproducing head.

According to another aspect of the present invention, there is provided a method for reproducing a recorded signal. The method comprises a step of reproducing the recorded signal using a head assembly including multiple reproducing heads provided for a single track with the heads being deviated in their positions from each other in the track width direction. The method also comprises a step of processing a reproduced signal. This reproduced signal processing step includes the sub-steps of performing error correction processing on data generated from a signal obtained by the multiple reproducing heads, discriminating a reproducing head whose tracing condition of a target track is appropriate from the multiple reproducing heads based on a result of the error correction, and generating an output signal using a signal obtained by the discriminated reproducing head.

According to the present invention, the head assembly including multiple reproducing heads is provided for a single track with the heads being deviated from each other in their positions in the track width direction. Data generated from a signal obtained by the multiple reproducing heads is error-corrected using an internal code parity. When obtaining an error correction result indicating that the error correction is possible, it is determined that a reproducing head corresponding to data, which obtains the error correction result, is a reproducing head whose tracing condition of a target track is appropriate. When multiple error correction results each indicating that the error correction is possible are obtained, or when an error correction result indicating that the error correction is impossible is obtained, the reproducing head reading out a signal, which includes the track information indicating the target track, is discriminated. It then is determined that this reproducing head is a proper reproducing head. An output signal is then generated using the signal obtained by the determined reproducing head. Further, when the track records signals successively by the sync-block unit, a proper reproducing head is discriminated by the sync-block unit using the error correction result and the track identification information based on a signal gained by tracing the same sync-block section. The head assembly is driven in the track width direction corresponding to an amount of off track with respect to the target track. Consequently, the allowance of off track can be increased as compared with a case where a target track is traced with a single reproducing head, so that a narrow track system is achieved to reproduce the target track properly.

Further, discriminating a reproducing head whose tracing condition is appropriate using the error correction result based on the internal code parity allows load to be reduced as compared with the case where an error correction result using the external code parity is used.

A reproducing head whose tracing condition of a target track is appropriate is discriminated using the error correction result obtained by the error correction and the track identification information indicated by a signal obtained by the multiple reproducing heads. If there is a plurality of error correction results each indicating that the error correction is possible or an error correction result indicating that the error correction is impossible is obtained, it is determined that a head corresponding to a signal indicating the target track according to the track identification information is a reproducing head whose tracing condition of the target track is appropriate. Thus, the reproducing head whose tracing condition of a target track is appropriate can be discriminated easily.

Discriminating a proper reproducing head by a sync-block unit using the error correction result based on a signal gained by tracing the same sync-block as the recorded sync-block and the track identification information allows an excellent signal to be selected by the sync-block unit from signals obtained by tracing the target track with the multiple reproducing heads.

Additionally, because the head assembly is driven in the track width direction corresponding to the amount of an off track with respect to the target track, a reproduced signal can be reproduced from the target track at the time of the special reproducing operation as well.

The concluding portion of this specification particularly points out and directly claims the subject matter of the present invention. However, those skilled in the art will best understand both the organization and method of operation of the invention, together with further advantages and objects thereof by reading the remaining portions of the specification in view of the accompanying drawing(s) wherein like reference characters refer to like elements.

BRIEF DESCRIPTION OF DRAWINGS

FIGS. 2A to 2F are diagrams each showing the relationship between the output levels of reproducing heads and an amount of off track;

FIGS. 3A to 3C are diagrams each explaining a track reproducing state;

FIGS. 5A to 5E are diagrams each explaining the operations of a reproduced signal processing section;

FIGS. 7A and 7B are diagrams each explaining track patterns;

FIGS. 10A to 10Q are diagrams each explaining the operation of the signal selecting device; and FIG. 11 is a diagram for explaining the operation of a determining circuit.

DESCRIPTION OF THE PREFERRED EMBODIMENTS

Figure 1:
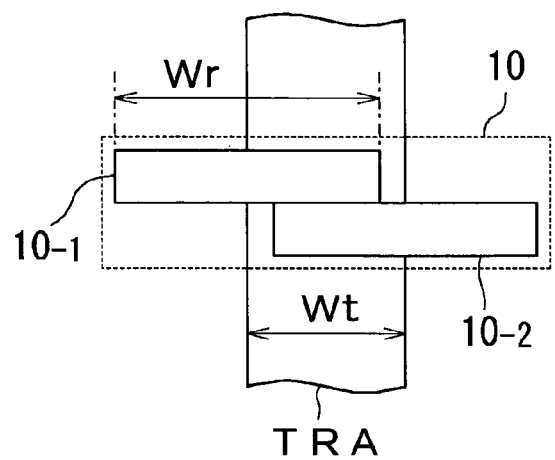
FIG. 1 is a diagram for showing a configuration of a head assembly.

Hereinafter, preferred embodiments of the present invention will be described with reference to the accompanying drawings. FIG. 1 shows a head assembly 10 for use in the apparatus for reproducing a recorded signal of the present invention. In the head assembly 10, multiple reproducing heads are provided for a single track TRA, with the heads being deviated in their positions from each other in the track width direction. For example, a reproducing head 10-1 and a reproducing head 10-2 are provided for a track TRA and the reproducing head 10-2 is provided such that its position is deviated in the width direction of the track TRA to the reproducing head 10-1. Meanwhile, the head assembly 10 may be so constructed by disposing multiple head gaps within a single reproducing head with the gaps being deviated from each other in the track width direction. For a subsequent description, a case where multiple reproducing heads are provided will be described.

This head assembly 10 is installed through an actuator, such as a piezoelectric element, and driven in the track width direction by the actuator. The reproducing head driven in the track width direction is called a dynamic tracking head (DT head). This DT head is driven in the track width direction by the actuator based on a drive signal generated corresponding to the amount of the off track. Thus, even at the time of the special reproducing operation, its reproducing head traces a target track properly so as to achieve noiseless reproduction.

The track width Wr of a head gap in each of the reproducing heads 10-1, 10-2 is constructed to be wider than the track width Wt of the track TRA. The deviation amount in the track width direction of the reproducing head 10-2 with respect to the reproducing head 10-1 is set up so that even if the trace position of the reproducing head 10-1 is deviated in the track width direction and the track TRA signal cannot be reproduced properly, the track TRA is traced by the reproducing head 10-2 so as to reproduce the track TRA signal properly.

FIGS. 2A to 2F show the relationship between the output levels of the reproducing heads and the off track amount. Here, for simplification of a subsequent explanation, it is assumed that a position when the center of the reproducing head 10-1 is equal to the center of the track TRA as shown in FIG. 2B is an off track amount "0".

When the off track amount is "0", the output level of the reproducing head 10-1 is level L1, as indicated in FIG. 2A. If the position of the track TRA is deviated in the direction of an arrow "a" with respect to the reproducing head 10-1 so that it becomes larger than the off track amount PE1 indicated in FIG. 2C, the track TRA leaves the reproducing head 10-1. Thus, as indicated in FIG. 2A, as the off track amount increases, the output level of the reproducing head 10-1 is lowered. Likewise, if the position of the track TRA is deviated in the direction of an arrow "b", which is opposite to the direction of the arrow "a" with respect to the reproducing head 10-1 so that it becomes larger than the off track amount PE1 indicated in FIG. 2D, the track TRA leaves the reproducing head 10-1. Thus, as indicated in FIG. 2A, as the off track amount increases, the output level of the reproducing head 10-1 is lowered.

Next, if the off track amount is PE2 as shown in FIG. 2E and the track width covered by the reproducing head 10-1 becomes substantially equal to the track width covered by the reproducing head 10-2, their output levels become equal to each other as shown in FIG. 2A when the output characteristics of the reproducing heads 10-1, 10-2 are equal.

If the track TRA is moved further in the direction of the arrow "b" so that the off track amount indicated in FIG. 2F becomes larger than PE3, the track TRA leaves the reproducing head 10-2. Thus, as indicated in FIG. 2A, as the off track amount increases, the output level of the reproducing head 10-2 is lowered.

Thus, if an off track range exceeding an output level "L2" is set to off track allowance, when the reproducing head 10-1 and the reproducing head 10-2 that is deviated in the track width direction are provided, a reproducing head whose output level becomes larger than the "L2" when a target track is being reproduced is regarded as a reproducing head which performs appropriate tracing. Thus, a signal obtained through this reproducing head is selected for usage. At this time, the off track allowance turns to "Qd", which can expand the off track allowance wider than an off track allowance "Qs" obtained when a single reproducing head is used.

If the position deviation amount of the reproducing head is set so that the output level when the track widths covered by the reproducing head 10-1 and the reproducing head 10-2 are substantially equal as shown in FIG. 2E is level "L2", the off track allowance can be set to its maximum level. Additionally, if the position when the track widths covered by the reproducing head 10-1 and the reproducing head 10-2 are substantially equal to each other is assumed to be "0", the off track allowance to a position deviation in the direction of an arrow "a" of the track TRA can be made substantially equal to the off track allowance to a position deviation in the direction of the arrow "b".

FIGS. 3A to 3C show a track reproduction condition when the track TRA is reproduced by the reproducing head 10-1 and the reproducing head 10-2. FIG. 3A schematically shows the track TRA and the reproducing heads 10-1, 10-2. When the reproducing head 10-1 reproduces the track TRA in which such a curve is generated, the output level of the reproducing head 10-1 is the one indicated in FIG. 3B. That is, the output level of the reproducing head 10-1 turns into a level corresponding to the width of the track TRA to be traced. When the reproducing head 10-2 reproduces the track TRA, the output level of the reproducing head 10-2 is the one indicated in FIG. 3C. That is, the output level of the reproducing head 10-2 turns into a level corresponding to the width of the track TRA to be traced. A reproducing head whose tracing condition for the track TRA is appropriate is determined based on the output levels of the reproducing heads 10-1, 10-2. Signals reproduced by the reproducing head, which is determined to be an appropriate reproducing head, are selected successively. This allows an apparatus for reproducing a recorded signal to have a wide off track allowance.

The track traced by multiple reproducing heads may be a track formed in a driving direction of a recording medium, for example, a track formed in the length direction of a magnetic tape or a track formed obliquely with respect to a driving direction, for example, an oblique track formed on the magnetic tape according to a helical scanning method like a video tape recorder or the like.

Figure 4:
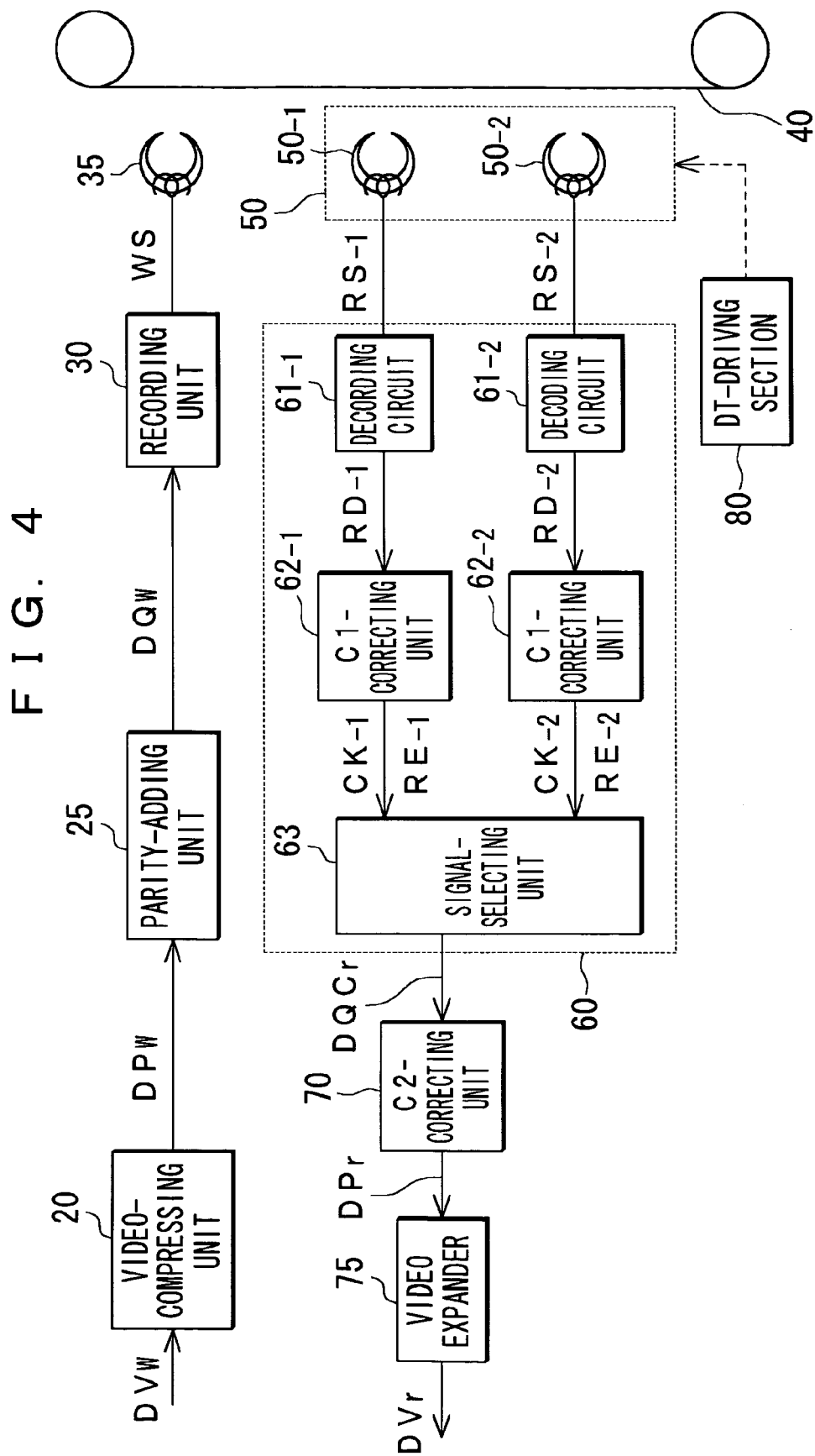
FIG. 4 is a diagram for showing a configuration of a video tape recorder.

FIG. 4 shows a configuration of a video tape recorder to which the apparatus for reproducing a recorded signal according to the present invention is applied.

Digital recording video signal DVw is compressed in a video-compressing unit 20 according to moving picture experts group (MPEG) method to generate coded data DPw. The video-compressing unit 20 supplies it to a parity-adding unit 25.

The parity-adding unit 25 generates an error correction code to the coded data DPw and adds the error correction code to it. For example, when a Reed-Solomon code whose code length is "Nc" and whose information amount is "KNc" is generated as an internal code parity C1 while a Reed-Solomon code whose code length is "Mc" and whose information amount is "KMc" is generated as an external code parity C2, the coded data DPw is written by only a code length of "KNc" in a horizontal direction of a memory (not shown). Each time when writing by the code length of "KNc" is executed, the write position is moved in a vertical direction thereof and data is written by the code length of "KNc" in the horizontal direction and by the code length of "KMc" in the vertical direction. After that, memory data is read out successively in the vertical direction and the external code parity C2 is computed.

Next, memory data is read successively in the horizontal direction and the internal code parity C1 is computed. Further, the external code parity C2 for the information amount "KMc" generated in the vertical direction is read out in the horizontal direction so as to generate the internal code parity C1 to the external code parity C2. The internal code parity C1 and the external code parity C2 generated in this way are added to the coded data DPw to generate the coded data DQw.

Further, a recording unit 30 adds synchronous code and identification code to the coded data DQw generated by the parity adding unit 25 so as to generate recording data for each track. This identification code comprises track identification information that is set to enable individual tracks to be determined, segment identification information that is set up to determine to which segment a track belongs, and the like. The recording unit 30 executes channel coding of the recorded data, converts an obtained signal to a recording current WS, and supplies it to a recording head 35 loaded on a rotary drum.

The recording head 35 records signals on a magnetic tape 40 according to a helical scanning method so as to form a track TRA. In the meantime, a track adjacent to the track TRA has a predetermined azimuth angle.

A DT head 50, which is provided on the rotary drum (not shown) through an actuator such as the aforementioned piezoelectric device, reads a recorded signal out of the magnetic tape 40. The DT head 50 is provided for a single track such that, as described above, two reproducing heads 50-1, 50-2 are deviated to each other in the track width direction. Further, the actuator in DT-driving section 80 is driven corresponding to the amount of the off track to a target track, so that even at the time of the special reproducing operation, the reproducing heads 50-1, 50-2 are driven in the track width direction so as to trace the target track.

A reproduced signal RS-1 obtained by the reproducing head 50-1 is supplied to a decoding circuit 61-1 in a reproduced signal processing section 60. The decoding circuit 61-1 executes waveform reshaping by adjusting the amplitude and phase of the reproduced signal RS-1 and executes decoding processing corresponding to the channel coding, which has been carried out by the recording section 30, so as to generate reproduced data RD-1. It supplies this reproduced data RD-1 to a C1-correcting unit 62-1.

A reproduced signal RS-2 obtained by the reproduction head 50-2 is supplied to a decoding circuit 61-2 in the reproduced signal processing section 60. The decoding circuit 61-2 executes waveform reshaping by adjusting the amplitude and phase of the reproduced signal RS-2 like the decoding circuit 61-1 and further executes decoding processing so as to generate reproduced data RD-2. It supplies this reproduced data RD-2 to a C1 correcting unit 62-2.

The C1 correcting unit 62-1 performs an error correction using the internal code parity C1 contained in coded data DQr1 which configures the reproduced data RD-1 and notifies a signal-selecting unit 63 of a error correcting result CK-1. After the error correction the coded data DQr-1 is supplied to the signal-selecting unit 63 as corrected data RE-1. If the error correction result CK-1 is supplied to the signal-selecting unit 63 in a form in which it is buried in the corrected data RE-1 as a notice about the error correction result CK-1, the error correction result CK-1 and the corrected data RE-1 can be supplied to the signal-selecting unit 63 as one signal stream.

The C1 correcting unit 62-2 performs error correction using the internal code parity C1 contained in coded data DQr-2 which configures the reproduction data RD-2 like the C1 correcting unit 62-1 and notifies the signal-selecting unit 63 of a error correction result CK-2. After error correction the coded data DQr-2 is supplied to the signal-selecting unit 63 as corrected data RE-2.

The signal-selecting unit 63 selects the corrected data RE-1, RE-2 using the error correction results CK-1, CK-2 supplied from the C1-correcting units 62-1, 62-2 and supplies the corrected data thus selected to the C2-correcting unit 70 as the coded data DQCr.

FIGS. 5A to 5E are diagrams for explaining the operation of the reproduced signal processing section 60. FIG. 5A shows the output level of the reproducing head 50-1 and FIG. 5B shows the output level of the reproducing head 50-2. FIG. 5C shows the error correction result CK-1 using the internal code parity C1 contained in the coded data DQr-1 and FIG. 5D shows the error correction result CK-2 using the internal code parity C1 contained in the coded data DQr-2.

The signal-selecting unit 63 regards a reproducing head on the side of the C1-correcting unit, which notifies that error correction is enabled as a reproducing head whose tracing condition of a target track is appropriate. The signal-selecting unit 63 then selects coded data based on a reproduced signal gained through this reproducing head and supplies it to the C2-correcting unit 70 as the coded data DQCr. For example, if the notice "OK" indicating that the error correction is enabled is made as shown in FIG. 5E, the corrected data supplied from the C1-correcting unit which makes this notice is selected successively and supplied to the C2-correcting unit 70 as the coded data DQCr. Further, when the notice "NG" indicating that the error correction is impossible to make occur, supply of the coded data DQCr to the C2-correcting unit 70 is stopped so as to prevent the coded data DQCr having an error from being supplied to the C2-correcting unit 70.

The reproduced signal processing section 60 may select a signal based on a result of the error correction using the internal code parity C1 contained in the coded data DQr. The reproduced signal processing section 60 may also select the signal based on the output level of the reproducing heads 50-1, 50-2. That is, the decoding circuit 61-1 determines the output level LV-1 of the reproducing head 50-1 and notifies the signal-selecting unit 63 of it. Further, the decoding circuit 61-2 determines the output level LV-2 of the reproducing head 50-2 and notifies the signal-selecting unit 63 of it. The signal-selecting unit 63 selects the coded data DQr to be supplied to the C2-correcting unit 70 based on the notified output levels LV-1, LV-2. For example, a reproducing head having a larger output level is determined by comparing the output levels LV-1, LV-2. The coded data that is generated based on a signal from this determined reproducing head is supplied to the C2-correcting unit 70. If it is recognized that an error correction can be performed on the coded data generated based on a signal from this determined reproducing head and the coded data thus corrected is supplied to the C2-correcting unit 70, a more accurate coded data can be supplied to the C2 correcting unit 70. It is permissible to determine whether or not the output levels LV-1, LV-2 reach a predetermined level and select a coded data generated based on a signal from the reproducing head, which reaches the predetermined level, by means of the signal-selecting unit 63 and supply it to the C2-correcting unit.

The C2-correcting unit 70 performs the error corrects using the external code parity C2 contained in the coded data DQCr and supplies the coded data DPr after the error correction to a video expander 75. The video expander 75 receives and decodes the coded data DPr and outputs it as digital reproduced video signal DVr.

Configuring the DT head as a head assembly including multiple reproducing heads and providing it for a single track enables the off track allowance to be increased while a noiseless special reproduction function is maintained. If the narrow track pitch system is adopted, this prevents an error such as track deviation and track curve from occurring.

Figure 6:
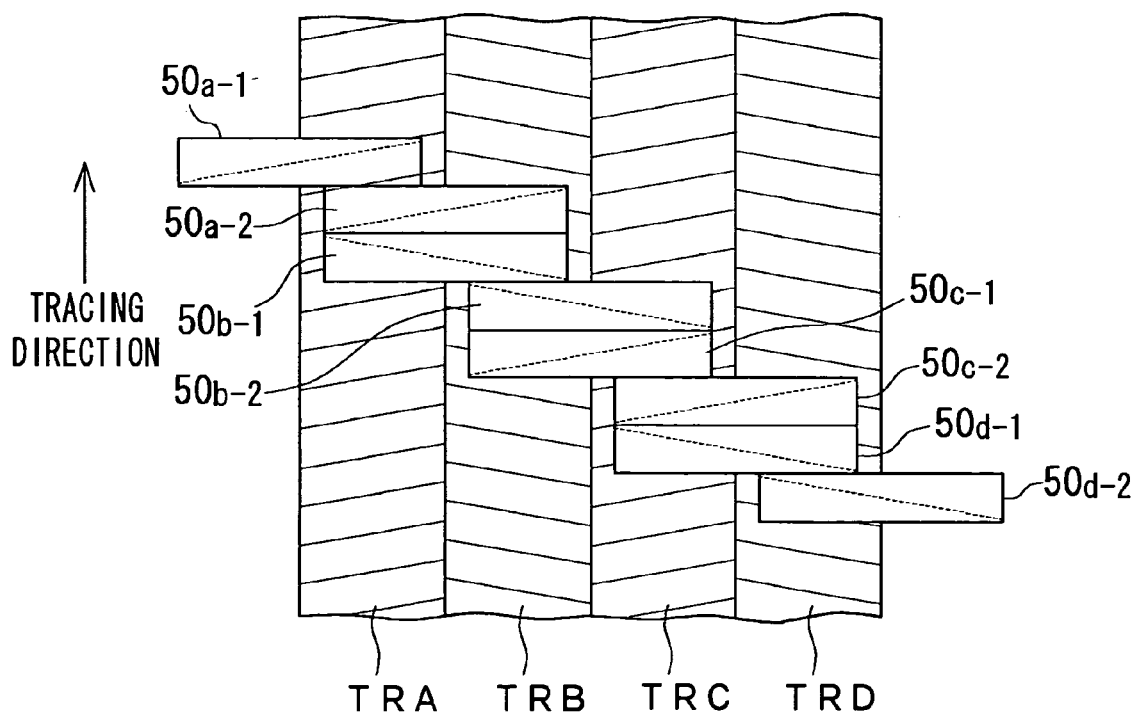
FIG. 6 is a diagram for showing a case where multiple tracks are traced at the same time.

In the above embodiment, a case where a single track is traced once has been described. If it is intended to trace multiple tracks at the same time, for example, trace four tracks at the same time as shown in FIG. 6, multiple reproducing heads are provided for each track such that their positions are deviated in the track width direction. That is, reproducing heads 50*a*-1, 50*a*-2 are provided corresponding to a track TRA, reproducing heads 50*b*-1, 50*b*-2 are provided corresponding to a track TRB, reproducing heads 50*c*-1, 50*c*-2 are provided corresponding to a track TRC, and reproducing heads 50*d*-1, 50*d*-2 are provided corresponding to a track TRD. By driving the reproducing heads 50*a*-1, 50*a*-2, 50*b*-1, 50*b*-2, 50*c*-1, 50*c*-2, 50*d*-1, 50*d*-2 in the track width direction by driving the actuator corresponding to the off track amount, the error can be suppressed by increasing the off track allowance when tracing multiple tracks at the same time as well as when tracing a single track.

Next, the second embodiment will be described. According to the above first embodiment, the signal-selecting unit 63 in FIG. 4 discriminates a reproducing head whose tracing condition of a target track is appropriate based on the error correction result and the output level of the reproducing head and supplies the corrected data that is generated based on a signal obtained by the discriminated reproducing head to the C2-correcting unit 70 so as to generate an output signal. According to the second embodiment, however, the signal-selecting unit 63 discriminates a reproducing head whose tracing condition of a target track is appropriate based on the correction result and the track identification information and supplies the corrected data that is generated based on a signal obtained by the discriminated reproducing head to the C2-correcting unit 70.

FIGS. 7A and 7B are diagrams for explaining the pattern of the track TRA. As shown in FIG. 7A, the track TRA includes a video sector in which video data is recorded and an audio sector in which audio data is recorded. Although FIG. 7A shows a case where the audio sector is provided between the video sectors, the video sector may be provided between the audio data. Further, it is permissible to provide an edit gap between the video sector and the audio sector or between the audio sectors so that those data can be rewritten independently of each other when editing the video data and audio data.

FIG. 7B shows a configuration of the recording data WD. An external code parity C2 computed for each item of the coded data DPw of Mc bytes is added to the coded data DPw of Mc×Nc bytes. Further, an internal code parity C1 computed for each item of the coded data DPw of Nc bytes or for each external code parity C2 of Nc bytes is added so as to generate the coded data DQw. A synchronous code and identification code are added to each item of coded data DQw consisting of this coded data DPw of Nc-bytes and the computed internal code parity C1. Alternatively, the synchronous code and the identification code are added to each item of coded data DQw consisting of the external code parity C2 of Nc-bytes and the computed internal parity C1 so as to produce recording data of a sync-block. The recording signal WS based on the recording data of this sync-block unit is supplied to the recording head 35 for recording it on the magnetic tape 40 so as to construct the video sector. The identification code mentioned here is a track identification information TID, which is set up to enable each track to be identified, or a segment identification information SID, which is set up to determine to which segment the track belongs, or the like. In the meantime, the audio sector can be formed in the same way as the video sector, although it is not shown.

Figure 9:
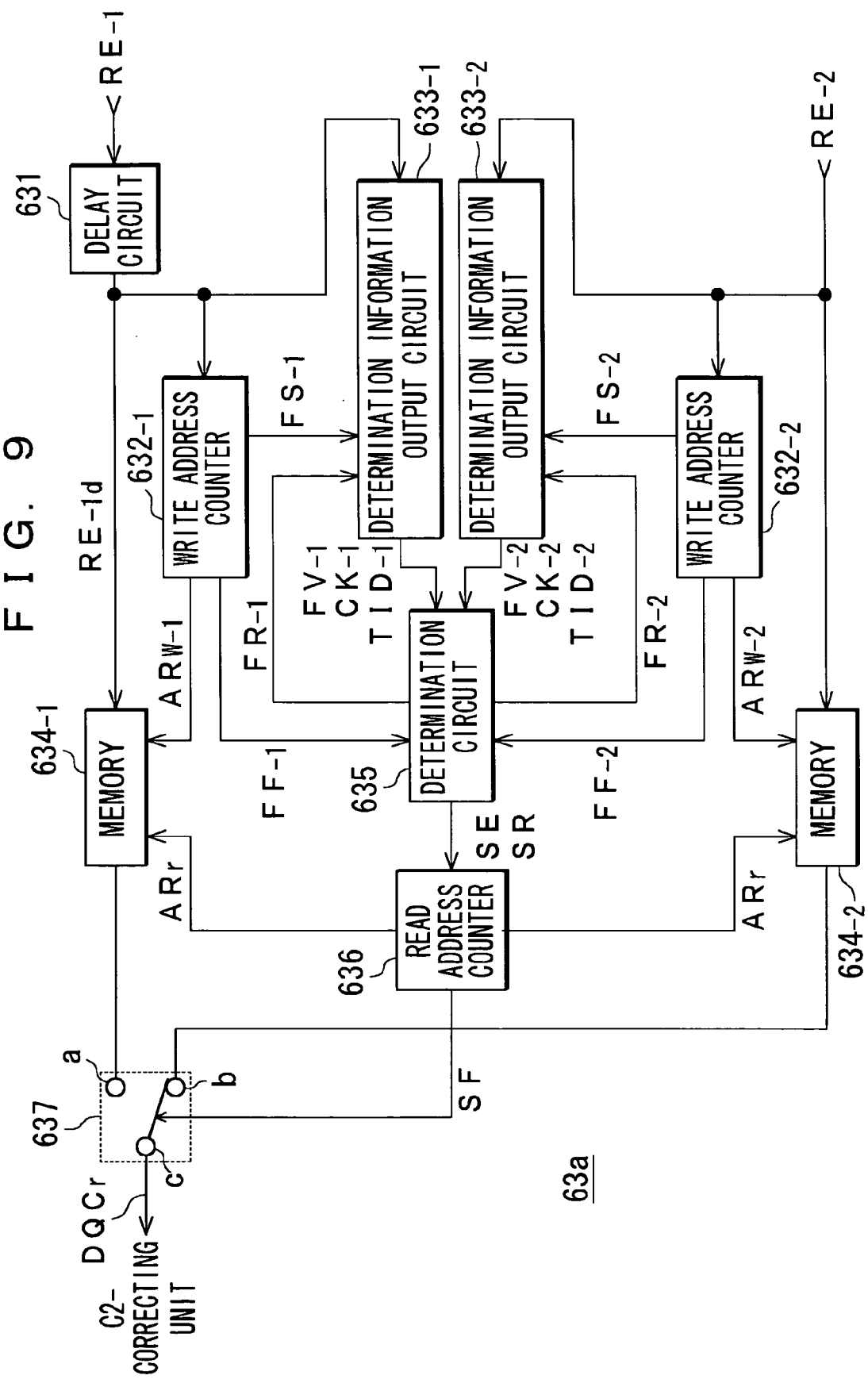
FIG. 9 is a diagram for showing a configuration of a signal-selecting device of another embodiment of the invention.

The C1-correcting unit 62-1 performs an error correction using the internal code parity C1 contained in the coded data DQr1, which constructs the reproduction data RD-1, and notifies a signal-selecting unit 63a, shown in FIG. 9, of the error correction result CK-1. Further, the C1-correcting unit 62-1 supplies the coded data DQr-1 after error correction to the signal-selecting unit 63a as the corrected data RE-1. If the error correction result CK-1 is supplied to the signal-selecting unit 63a such that it is buried in the corrected data RE-1 as a notice about the error correction result CK-1, the error correction result CK-1 and corrected data RE-1 can be supplied to the signal-selecting unit 63a as a single stream.

The C1-correcting unit 62-2 performs error correction using the internal code parity C1 contained in the coded data DQr-2, which constructs the reproduction data RD-2 like the C1-correcting unit 62-1 and supplies the error correction result CK-2 and the corrected data RE-2 to the signal-selecting unit 63a.

According to the second embodiment, the signal-selecting unit 63a selects a signal to be supplied to the C2-correcting unit 70 using the error correction results CK-1, CK-2 supplied from the C1-correcting units 62-1, 62-2, the track identification information TID-1 indicated by an identification code contained in the corrected data RE-1, and the track identification information TID-2 indicated by an identification code contained in the corrected data RE-2.

The track identification information contained in the corrected data RE-1, RE-2 is information corresponding to the off track amount of the reproducing heads 50-1, 50-2.

Figures 8A, 8B:
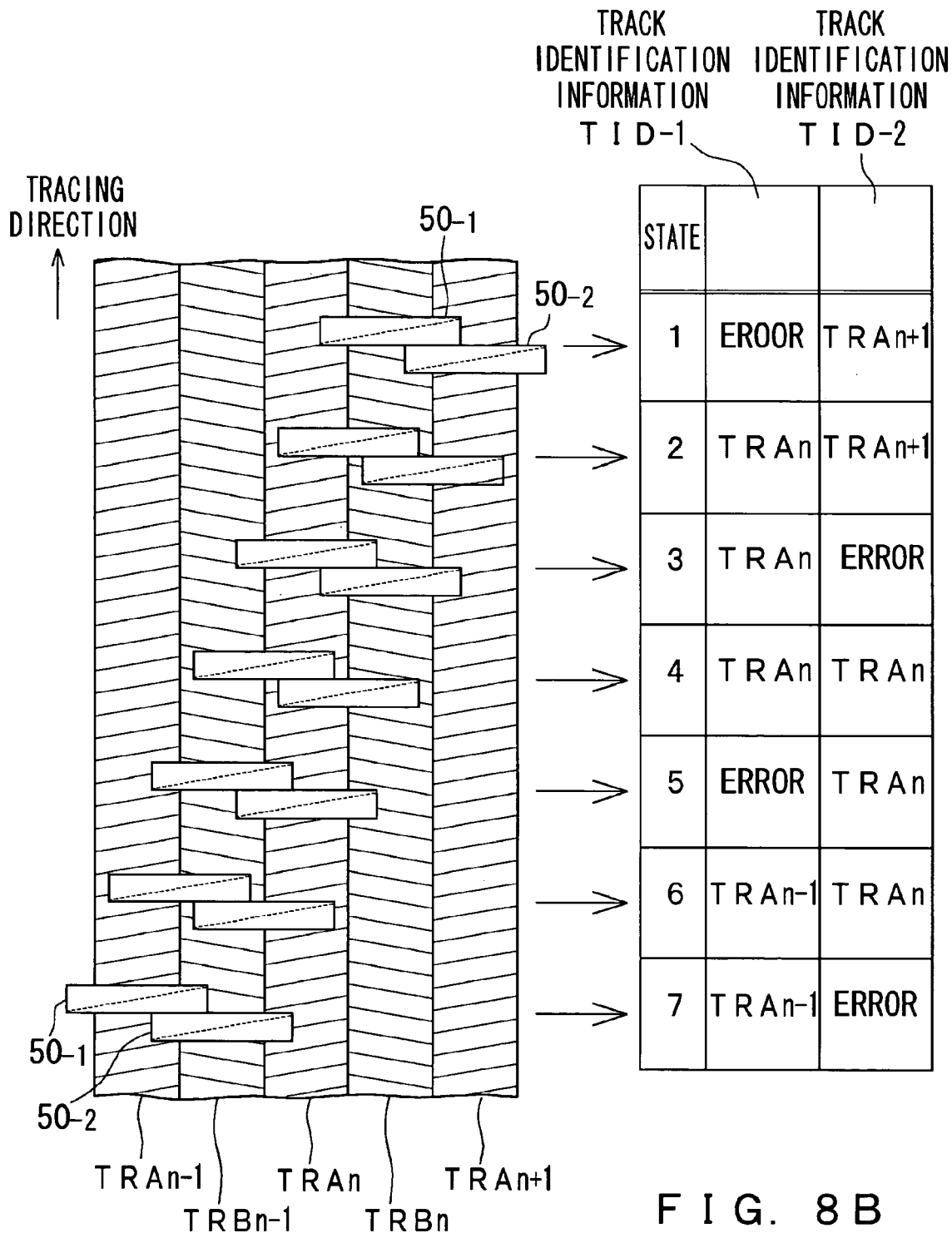
FIGS. 8A and 8B are diagrams each showing the relationship between positions of the reproducing heads and track identification information.

FIGS. 8A and 8B show the relationship between the position of the reproducing head and the track identification information. In case of "state 3" in which the reproducing head 50-1 is located in the center of a target track TRAn, as shown in FIG. 8A, the track TRAn is indicated by the track identification information TID-1 in the corrected data RD-1 as shown in FIG. 8B. A track TRBn, which adjoins the target track TRAn, is set to have a different azimuth. The track TRAn, which is traced by the reproducing head 50-2, is narrow. Therefore, the signal level of a reproduced signal of the track TRAn is so small that the corrected data RE-2 cannot be obtained, and consequently, the track identification information TID-2 suffers from an error.

If the with of a track TRAn traced by the reproducing head 50-1 is substantially equal to the width of a track TRAn traced by the reproducing head 50-2 as indicated in the "state 4", not only the track TRAn is indicated by the track identification information TID-1 of the corrected data RE-1, but also the track TRAn is indicated by the track identification information TID-2 of the corrected data RD-2.

If the width of the track TRAn-1 traced by the reproducing head 50-1 is substantially equal to the width of the track TRAn traced by the reproducing head 50-2 as indicated in the "state 6", not only track TRAn-1 is indicated by the track identification information TID-1 of the corrected data RE-1 but also track TRAn is indicated by the track identification information TID-2 of the corrected data RD-2.

The track identification information differs depending on the off track amount. That is, the track identification information enables the condition of the off track amount at the time of tracing to be determined.

FIG. 9 shows the structure of the signal-selecting unit 63a. If the reproducing head 50-1 is located ahead of the reproducing head 50-2, data after error correction of the reproduction data RD-1 based on the reproduced signal RS-1 obtained by the reproducing head 50-1, that is, the corrected data RE-1 from the C1-correcting unit 62-1 is supplied to a delay circuit 631. Meanwhile, it is assumed that the error correction result CK-1 is buried in the corrected data RE-1.

The delay circuit 631 substantially matches the phase of the corrected data RE-1 with the phases of the corrected data RE-2 and error correction result CK-2 supplied from the C1-correcting unit 62-2 by a sync-block unit by delaying the corrected data RE-1 only by the amount of a difference in time corresponding to a distance in the tracing direction between the reproducing head 50-1 and the reproducing head 50-2. The corrected data RE-1 delayed by this delay circuit 631 is supplied to a write address counter 632-1, a determination information output circuit 633-1 and a memory 634-1 as delayed corrected data RE-1d. As the memory 634-1 and a memory 634-2, which will be described later, a memory capable of writing and reading data at the same time, for example, a dual port RAM (random access memory) is used.

The write address counter 632-1 generates a write address signal ARw-1 for writing video and audio coded data or external code parity C2, which is contained in the corrected data RE-1 of a sync-block, into the memory 634-1 and supplies it to the memory 634-1. The memory 634-1 stores the video and audio coded data or the external parity C2 based on the write address signal ARw-1. When the write address reaches ½ a synch block, the write address counter 632-1 supplies a set signal FS-1 to the determination information output circuit 633-1. When the write address reaches the amount corresponding to a sync-block, a write address completion signal FF-1 is supplied to a determination circuit 635.

The determination information output circuit 633-1 extracts the error correction result CK-1 and track identification information TID-1 from the delayed corrected data RE-1d and latches the error correction result CK-1 and the track identification information TID-1 at a timing in which the set signal FS-1 is supplied from the write address counter 632-1 and supplies them to the determination circuit 635. Further, the determination information output circuit 633-1 supplies a validity flag FV-1 to the determination circuit 635. When the error correction result CK-1 and the track identification information TID-1 are latched, this validity flag FV-1 is set to a validity condition. When a reset signal FR-1 is supplied from the determination circuit 635, which will be described later, the validity flag FV-1 is set to an invalidity condition.

The write address counter 632-2 generates a write address signal ARw-2 for writing video and audio coded data or external parity C2, which is contained in the reproduction data RE-2, to the memory 634-2 like the write address counter 632-1 and supplies it to the memory 634-2. The memory 634-2 stores the video and audio coded data or the external code parity C2 based on the write address signal ARw-2. When the write address reaches ½ the amount of a sync-block, the write address counter 632-2 generates a set signal FS-2 and supplies it to the determination information output circuit 633-2. When the write address reaches the amount of a sync-block, it generates a write address completion signal FF-2 and supplies it to the determination circuit 635.

The determination information output circuit 633-2 extracts the error correction result CK-2 and the track identification information TID-2 from the corrected data RE-2 like the determination information output circuit 633-1 and latches the error correction result CK-2 and the track identification information TID-2 at a timing in which the set signal FS-2 is supplied from the write address counter 632-2 and supplies them to the determination circuit 635. Further, the determination information output circuit 633-2 supplies the validity flag FV-2 to the determination circuit 635. When the error correction result CK-2 and the track identification information TID-2 are latched, this validity flag FV-2 is set to a validity condition. When the reset signal FR-2 is supplied from the determination circuit 635, which will be described later, the validity flag FV-2 is set to an invalidity condition.

Each time when the write address completion signal FF-1 or write address completion signal FF-2 is supplied, the determination circuit 635 generates the reset signals FR-1, FR-2, the selection signal SE and the reading start signal SR based on the write address completion signals FF-1, FF-2, the validity flags FV-1, FV-2, the error correction results CK-1, CK-2 and the track identification information TID-1, TID-2. The reset signals FR-1, FR-2 are signals for setting the validity flag to a invalidity condition, as described above. The selection signal SE is a signal for setting whether or not a signal is read out of the memory 634-1 or 634-2. The read start signal SR is a signal for starting the reading of the signal from the set memory. This reset signal FR-1 is supplied to the determination information output circuit 631-1 and the reset signal FR-2 is supplied to the determination information output circuit 633-2. The selection signal SE and the read start signal SR are supplied to the read address counter 636.

The read address counter 636 generates a read-out address signal ARr based on the read start signal SR and supplies this read address signal ARr to a memory indicated by the selection signal SE. A selection signal SF is generated based on the selection signal SE and supplied to the selection circuit 637.

Data read out of the memory 634-1 is supplied to a terminal "a" of the selection circuit 637 and data read out of the memory 634-2 is supplied to a terminal "b" thereof A movable terminal "c" thereof is connected to the C2-correcting unit 70. When the selection signal SE indicates a memory 634-1, the movable terminal "c" is turned to the side of the terminal "a" by the selection signal SF, so that the data read out of the memory 634-1 is selected and supplied to the C2-correcting unit 70 as the coded data DQCr. When the selection signal SE indicates the memory 634-2, the movable terminal "c" is turned to the side of the terminal "b" by the selection signal SF, so that data read out of the memory 634-2 is selected and supplied to the C2-correcting unit 70 as the coded data DQCr.

Although the signal selecting unit 63a shown in FIG. 9 is so constructed that the error correction result and the track identification information and the like are supplied from the determination information output circuits 633-1, 633-2 to the determination circuit 635, the track identification information used for the servo operation may be supplied to the determination circuit 635 when the track identification information or the like is used in the servo operation for tape running, driving of the dynamic tracking head, which will be described later.

The C2-correcting unit 70 of FIG. 4 performs an error correction using the external code parity C2 contained in the coded data DQCr as described above, and supplies the coded data DPr after the error correction to the video expander 75. The video expander 75 decodes the coded data DPr thus received and outputs it as digital reproduced video signal DVr.

Although, according to the second embodiment, the reproduced video signal DVr is outputted using the signal obtained by the reproducing head determined that its tracing condition of a target track is appropriate, needless to say, the output signal is not restricted to a signal after the error correction or a decoded signal.

FIGS. 10A to 10Q are timing charts each indicating the operations of the signal-selecting unit 63a. FIG. 10A shows the corrected data RE-1 and FIG. 10B shows the delayed corrected data RE-1d, which is outputted from the delay circuit 631. FIG. 10I shows the corrected data RE-2. The delayed corrected data RE-1d and the corrected data RE-2 are synchronous with each other in the unit of sync-block. FIG. 10C shows an address indicated by the write address signal ARw-1 and FIG. 10J shows an address indicated by the write address signal ARw-2.

At the time of t1, if the write address signal ARw-2 turns to ½ of the amount of a sync-block and the set signal FS-2 shown in FIG. 10K is supplied to the determination information output circuit 633-2, that is, the set signal FS-2 turns to a high level "H", the error correction result CK-2 and the track identification information TID-2 are latched as shown in FIG. 10O and supplied to the determination circuit 635. As shown in FIG. 10N, the validity flag FV-2 is set to a validity condition. The supply of the set signals FS-1, FS-2, the write address completion signals FF-1, FF-2 and the reset signals FR-1, FR-2 in FIGS. 10A to 10Q is indicated by the high level "H" of the signal.

Next, if the write address signal ARw-1 turns to ½ of the amount of sync-block at time t2, so that the set signal FS-1 is supplied to the determination information output circuit 633-1 as shown in FIG. 10D, the error correction result CK-1 and the track identification information TID-1 are latched and supplied to the determination circuit 635 as shown in FIG. 10H. As shown in FIG. 10G, the validity flag FV-1 is set to a validity condition.

If at a time t3, the write address signal ARw-2 meets the amount of a sync-block and the write address completion signal FF-2 shown in FIG. 10L is supplied to the determination information output circuit 633-2, the determination circuit 635 generates the reset signals FR-1, FR-2, the selection signal SE and the read start signal SR based on the write address completion signals FF-1, FF-2, the validity flags FV-1, FV-2, the error correction results CK-1, CK-2 and the track identification information TID-1, TID-2.

If one of the error correction results CK-1, CK-2, which are validated by the validity flags FV-1, FV-2, indicates that the error correction is possible while another thereof indicates that the error correction is impossible, the determination circuit 635 generates the selection signal SE to select a memory connected to the C1-correcting unit whose error correction is completed. Further, if the error correction results CK-1, CK-2 indicate that the error correction is possible or that the error correction is impossible, the selection signal SE is generated to select a memory connected to the C1-correcting unit that has output the reproduced data that indicated a target track identification information.

FIG. 11 lists the operations of the determination circuit 635. In the write address completion signals FF-1, FF-2, "1" indicates that the signal arrives at the amount of a sync-block and a determination is carried out when it arrives at a synch block. "0" indicates that the signal does not arrive at the amount of a synch block. In the validity flags FV-1, FV-2, "1" indicates a validity condition and "0" indicates an invalidity condition. The determination is made using the error correction result and the track identification information. In the error correction results CK-1, CK-2, "OK" indicates that error correction is possible and "NG" indicates that error correction is impossible. In the track identification information TID-1, TID-2, "OK" indicates that track identification information of a target track is obtained and "NG" indicates that the track identification information of the target track is not obtained. In the selection signal SE, "PRECEDE" indicates that the memory 634-1, which stores data based on a signal obtained by the reproducing head 50-1, is selected and "FOLLOW" indicates that the memory 634-2, which stores data based on a signal obtained by the reproducing head 50-2, is selected. Further, 'NOP' indicates that no selection operation is carried out. If any memory is selected here, the read start signal SR is generated although not shown. In the reset signals FR-1, FR-2, "1" indicates that a reset operation is carried out and "0" indicates that no reset operation is carried out.

Because at a time t3 shown in FIGS. 10A to 10Q, only the write address completion signal FF-2 indicates a completion and both the validity flags FV-1, FV-2 are in validity conditions, this case falls under any of the conditions 18–25. If the error correction result CK-1 indicates that the error correction is possible and the error correction result CK-2 indicates that the error correction is impossible, that case falls under the condition 25, in which only the reset signal FR-2 shown in FIG. 10M is generated and outputted. At this time, the validity flag FV-2 is in an invalidity condition.

At a time t4, if the write address signal ARw-1 meets the amount of a sync-block, so that the write address completion signal FF-1 is supplied to the determination circuit 635 as shown in FIG. 10E, the determination circuit 635 generates the reset signals FR-1, FR-2, the selection signal SE and read start signal SR based on the write address completion signals FF-1, FF-2, the validity flags FV-1, FV-2, the error correction results CK-1, CK-2 and the track identification information TID-1, TID-2.

In this case, because only the write address completion signal FF-1 indicates a completion and only the validity flag FV-1 is in a validity condition, this case falls under the condition 5. Then, as shown in FIG. 10P, the memory 634-1 is selected by the selection signal SE, the read address signal ARr shown in FIG. 10Q is supplied to the memory 634-1 and data of the "TRAn" sync-block stored in the memory 634-1 is supplied to the C2-correcting unit 70. Reading of data stored in the memory is completed before the write address completion signal FF-1 and the write address completion signal FF-2 are supplied to the determination circuit 635. The "TRAn" sync-block generates only the reset signal FR-1 shown in FIG. 10F and outputs it because it is determined that data stored in the memory 634-1 is used. At this time, the validity flag FV-1 is in an invalidity condition.

Next, if at a time t5, the write address signal ARw-2 meets the amount of a sync-block and the write address completion signal FF-2 is supplied to the determination circuit 635, only the write address completion signal FF-2 indicates a completion. Further because after the reset signal FR-2 at the time t3 and the reset signal FR-1 at the time t4, the set signals FS-1, FS-2 are outputted as shown in FIG. 10D and FIG. 10K so that both the validity flags FV-1, FV-2 are in a validity condition, this case falls under any of the conditions 18–25. Further, if the error correction result CK-1 indicates that the error correction is impossible while the error correction result CK-2 indicates that the error correction is possible, this case falls under the condition 18. Thus, the memory 634-2 is selected by the selection signal SE as shown in FIG. 10P, the read address signal ARr is supplied to the memory 634-2, and data in the "TRAn+1" sync-block stored in the memory 634-2 is supplied to the C2-correcting unit 70. Further, because it is determined that data stored in the memory 634-2 is used, the "TRAn+1" sync-block outputs the reset signal FR-2 shown in FIG. 10M to turn the validity flag FV-2 to an invalidity condition. Further, the reset signal FR-1 shown in FIG. 10F is generated to turn the unnecessary error correction result CK-1 and track identification information TID-1 to an invalidity condition.

If at the time t6, the address signal ARw-1 meets the amount of a sync-block and the write address completion signal FF-1 is supplied to the determination circuit 635, only the write address completion signal FF-2 indicates a completion and the validity flags FV-1, FV-2 are in an invalidity condition. Therefore, this case falls under the condition 2, in which no selection signal SE and no reset signals FR-1, FR-2 are generated.

If at a time t7, the write address signal ARw-1 meets the amount of a sync-block and the write address completion signal FF-1 is supplied to the determination circuit 635, only the write address completion signal FF-1 indicates a completion. Further, because after the reset signals FR-1, FR-2 at the time t5, the set signals FS-1, FS-2 are outputted as shown in FIGS. 10D and 10K and both the validity flags FV-1, FV-2 are in validity condition, the condition falls under any one of the conditions 6–9, 11–13, and 15. If the error correction results CK-1, CK-2 indicate that the error correction is possible, the track identification information TID-1 indicates a target track and the track identification information TID-2 does not indicate a target track, this condition falls under the condition 7. Thus, the memory 634-1 is selected by the selection signal SE, the read address signal ARr is supplied to the memory 634-1, and then data of the "TRAn+2" sync-block stored in the memory 634-1 is supplied to the C2-correcting unit 70. Because it is determined that data stored in the memory 634-1 is used, the "TRAn+2" sync-block generates the reset signal FR-1 shown in FIG. 10F and outputs it to turn the validity flag FV-1 to an invalidity condition. Additionally, the reset signal FR-2 shown in FIG. 10M is generated to turn the unnecessary error correction result CK-2 and track identification information TID-2 to invalidity condition.

It is determined which condition shown in FIG. 11 falls thereunder and the selection signal SE and the reset signals FR-1, FR-2 are generated corresponding to that condition and a signal to be supplied to the C2-correcting unit 70 is selected. When the write address signal turns to ½ of the amount of a sync-block, the set signal is supplied to the determination information output circuit, and then the error correction result and track identification information are latched. When the write address signal arrives at the amount of a sync-block, a reproducing head whose tracing condition of a target track is appropriate is determined. When an appropriate reproducing head is determined, the delayed corrected data RE-1 and corrected data RE-2 enable a difference of ±½ sync-block to be allowed if information of the other reproducing head turns to an invalidity condition.

Because multiple reproducing heads are provided for a single track such that their positions are deviated in the track width direction, and then a signal to be supplied to the C2-correcting unit 70 is selected based on the error correction result and the track identification information, a large off track allowance can be achieved. Further, because the supply of an erroneous synch block data to the C2-correcting unit can be suppressed, generation of an error can be blocked.

If the reproducing heads 50-1, 50-2 are driven in the track width direction to trace a target track by activating the actuator corresponding to the off track amount of the reproducing heads 50-1, 50-2, the off track allowance can be increased while the noiseless special reproduction function is maintained. Consequently, even if the narrow track pitch system is adopted, generation of an error due to track deviation or curving of a track or the like can be suppressed.

According to the above-described embodiment, a case where a single track is traced once has been described. If it is intended to trace a plurality of tracks once, for example, four tracks are traced at the same time as indicated in FIG. 6 described above, the multiple reproducing heads are provided for each track such that their positions are deviated in the track width direction. If the reproducing heads 50*a*-1, 50*a*-2 are provided corresponding to the track TRA, the reproducing heads 50*b*-1, 50*b*-2 are provided corresponding to the track TRB, the reproducing heads 50*c*-1, 50*c*-2 are provided corresponding to the track TRC and the reproducing heads 50*d*-1, 50*d*-2 are provided corresponding to the track TRD, even if the multiple tracks are traced at the same time, the off track allowance can be expanded by carrying out the above-described processing like a case where a single track is traced.

As described above, the recording signal reproducing apparatus and recording signal reproducing method of the present invention are useful for the narrow track pitch and suitable for reproduction of a target track when a special reproducing operation is executed.

While the foregoing specification has described preferred embodiment(s) of the present invention, one skilled in the art may make many modifications to the preferred embodiment without departing from the invention in its broader aspects. The appended claims, therefore, are intended to cover all such modifications as fall within the true scope and spirit of the invention.

What is claimed is:

1. An apparatus for reproducing a recorded signal comprising:
   a head assembly including multiple reproducing heads provided for a single track with said heads being deviated in their positions from each other in the track width direction; and
   a reproduced signal processor for performing error correction processing on data generated from a signal obtained by said multiple reproducing heads, discriminating a reproducing head whose tracing condition of a target track is appropriate from said multiple reproducing heads based on a result of the error correction, and generating an output signal using a signal obtained by the discriminated reproducing head wherein said reproduced signal processor executes said error correction and, when obtaining an error correction result indicating that the error correction is possible, the reproduced signal processor determines that a reproducing head corresponding to data, said data obtaining the error correction result, is a reproducing head whose tracing condition of a target track is appropriate.

2. The apparatus according to claim 1, wherein said reproduced signal processor performs the error correction using an internal code parity.

3. The apparatus according to claim 1, wherein said reproduced signal processor discriminates a reproducing head whose tracing condition of said target track is appropriate using the error correction result obtained through said error correction and track identification information indicated by a signal obtained by said multiple reproducing heads.

4. The apparatus according to claim 3, wherein in one of the cases where multiple error correction results each indicating that the error correction is possible are obtained and where an error correction result indicating that the error correction is impossible is obtained, said reproduced signal processor determines that the reproducing head reading out a signal, said signal including said track information indicating said target track, is a reproducing head whose tracing condition of said target track is appropriate.

5. The apparatus according to claim 3, wherein said track records signals successively by the sync-block unit and said reproduced signal processor discriminates a reproducing head whose tracing condition of said target track is appropriate using the error correction result and the track identification information based on a signal gained by tracing the same sync-block section, by the sync-block unit.

6. The apparatus according to claim 1, further comprising a driving device for driving said head assembly in said track width direction corresponding to an amount of off tranck with respect to said target track.

7. A method for reproducing recorded signal comprising the steps of:
   reproducing the recorded signal using a head assembly including multiple reproducing heads provided for a single track with said heads being deviated in their positions from each other in a track width direction; and
   processing reproduced signal, said reproduced signal processing step including the sub-steps of:
   performing error correction processing on data generated from a signal obtained by said multiple reproducing heads;
   discriminating a reproducing head whose tracing condition of a target track is appropriate from said multiple reproducing heads based on a result of the error correction; and
   generating an output signal using a signal obtained by the discriminated reproducing head,
   wherein said error correction processing is performed in said reproduced signal processing step and when obtaining an error correction result indicating that the error correction is possible, it is determined that a reproducing head corresponding to data, said data obtaining the error correction result, is a reproducing head whose tracing condition of a target track is appropriate.

8. The method according to claim 7, wherein an error correction processing is performed in said reproduced signal processing step using an internal code parity.

9. The method according to claim 7, wherein a reproducing head whose tracing condition of said target track is appropriate is discriminated in said reproduced signal processing step using the error correction result obtained through said error correction and track identification information indicated by a signal obtained by said multiple reproducing heads.

10. The method according to claim 9, wherein in one of the cases where multiple error correction results each indicating that the error correction is possible are obtained and where an error correction result indicating that the error correction is impossible is obtainable, it is determined that the reproducing head reading out a signal, said signal including said track information indicating said target track, is a reproducing head whose tracing condition of said target track is appropriate.

11. The method according to claim 9, wherein said track records signals successively by the sync-block unit and in said reproduced signal processing step, a discrimination of a reproducing head whose tracing condition of said target track is appropriate is performed using the error correction result and the track identification information based on a signal gained by tracing the same sync-block section, by the sync-block unit.

12. The method according to claim 7, further comprising a driving step for driving said head assembly in said track width direction corresponding to an amount of off track with respect to said target track.

13. An apparatus for reproducing a recorded signal comprising:
a head assembly including multiple reproducing heads provided for a single track with said heads being deviated in their positions from each other in the track width direction; and
a reproduced signal processor for performing error correction processing on data generated from a signal obtained by said multiple reproducing heads, discriminating a reproducing head whose tracing condition of a target track is appropriate from said multiple reproducing heads based on a result of the error correction, and generating an output signal using a signal obtained by the discriminated reproducing head and,
further comprising a driving device for driving said head assembly in said tack width direction corresponding to an amount of off track with respect to said target track.

14. The apparatus according to claim 13, wherein said reproduced signal processor performs the error correction using an internal code parity.

15. The apparatus according to claim 13, wherein said reproduced signal processor discriminates a reproducing head whose tracing condition of said target track is appropriate using the error correction result obtained through said error correction and track identification information indicated by a signal obtained by said multiple reproducing heads.

16. The apparatus according to claim 15, wherein in one of the cases where multiple error correction results each indicating that the error correction is possible are obtained and where an error correction result indicating that the error correction is impossible is obtained, said reproduced signal processor determines that the reproducing head reading out a signal, said signal including said track information indicating said target track, is a reproducing head whose tracing condition of said target track is appropriate.

17. The method according to claim 16, wherein a reproducing head whose tracing condition of said target track is appropriate is discriminated in said reproduced signal processing step using the error correction result obtained through said error correction and track identification information indicated by a signal obtained by said multiple reproducing heads.

18. The apparatus according to claim 15, wherein said track records signals successively by the sync-block unit and said reproduced signal processor discriminates a reproducing head whose tracing condition of said target track is appropriate using the error correction result and the track identification information based on a signal gained by tracing the same sync-block section, by the sync-block unit.

19. The method according to claim 18, wherein an error correction processing is performed in said reproduced signal processing step using an internal code parity.

20. The method according to claim 19, wherein said track records signals successively by the sync-block unit and in said reproduced signal processing step, a discrimination of a reproducing head whose tracing condition of said target track is appropriate is performed using the error correction result and the track identification information based on a signal gained by tracing the same sync-block section, by the sync-block unit.

21. The method according to claim 19, wherein in one of the cases where multiple error correction results each indicating that the error correction is possible are obtained and where an error correction result indicating that the error correction is impossible is obtainable, it is determined that the reproducing head reading out a signal, said signal including said track information indicating said target track, is a reproducing head whose tracing condition of said target track is appropriate.

22. A method for reproducing recorded signal comprising the steps of:
reproducing the recorded signal using a head assembly including multiple reproducing heads provided for a single track with said heads being deviated in their positions from each other in a track width direction; and
processing reproduced signal, said reproduced signal processing step including the sub-steps of:
performing error correction processing on data generated from a signal obtained by said multiple reproducing heads;
discriminating a reproducing head whose tracing condition of a target track is appropriate from said multiple reproducing heads based on a result of the error correction; and
generating an output signal using a signal obtained by the discriminated reproducing head, and
further comprising a driving step for driving said head assembly in said track width direction corresponding to an amount of off track with respect to said target track.

* * * * *

UNITED STATES PATENT AND TRADEMARK OFFICE
CERTIFICATE OF CORRECTION

| | | |
|---|---|---|
| PATENT NO. | : 7,042,665 B2 | Page 1 of 1 |
| APPLICATION NO. | : 10/810717 | |
| DATED | : May 9, 2006 | |
| INVENTOR(S) | : Kaoru Urata et al. | |

It is certified that error appears in the above-identified patent and that said Letters Patent is hereby corrected as shown below:

<u>Column 16:</u>
Line 19, "tranck" should read -- track --.

<u>Column 17:</u>
Line 26, "tack" should read -- track --.

Signed and Sealed this

Nineteenth Day of June, 2007

JON W. DUDAS
*Director of the United States Patent and Trademark Office*